US008216063B2

(12) United States Patent
Acres

(10) Patent No.: US 8,216,063 B2
(45) Date of Patent: Jul. 10, 2012

(54) DEGRESSIVE BONUS SYSTEM

(75) Inventor: John F. Acres, Las Vegas, NV (US)

(73) Assignee: Patent Investment & Licensing Company, Las Vegas, NV (US)

(*) Notice: Subject to any disclaimer, the term of this patent is extended or adjusted under 35 U.S.C. 154(b) by 301 days.

(21) Appl. No.: 12/580,515

(22) Filed: Oct. 16, 2009

(65) Prior Publication Data

US 2011/0092276 A1 Apr. 21, 2011

(51) Int. Cl.
*A63F 13/00* (2006.01)

(52) U.S. Cl. ............................... 463/27; 463/25; 463/26

(58) Field of Classification Search .................... 463/23, 463/25, 26, 27, 30, 31
See application file for complete search history.

(56) References Cited

U.S. PATENT DOCUMENTS 3,633,915 A * 1/1972 Lippert ......................... 273/274
6,068,552 A * 5/2000 Walker et al. ................... 463/21
6,224,482 B1 * 5/2001 Bennett ........................... 463/20
2004/0017041 A1 * 1/2004 Inoue ........................ 273/143 R
2004/0242319 A1 * 12/2004 Walker et al. .................. 463/25

* cited by examiner

*Primary Examiner* — James S McClellan
(74) *Attorney, Agent, or Firm* — Marger Johnson & McCollom PC

(57) ABSTRACT

Embodiments of the invention include a mystery degressive bonus system. Instead of a bonus that increases its value as the likelihood of winning the bonus increases, embodiments of the invention disconnect the likelihood of winning a mystery bonus from the amount awarded for triggering the mystery bonus. In some embodiments as the likelihood of winning the mystery bonus increases, the award for winning the mystery bonus decreases. Some embodiments include a minimum value for winning the mystery bonus. Additional embodiments are directed to an indicator system to show to the player a present amount of the mystery bonus award as well as the likelihood of winning the award. Further embodiments include a gaming device that includes a bonus game in which the amount awarded to the player decreases over time.

19 Claims, 14 Drawing Sheets

DEGRESSIVE BONUS SYSTEM

FIELD OF THE INVENTION

This disclosure relates generally to gaming, and more particularly to systems that use a degressive progression scheme in awarding bonuses, and to the bonuses that use such schemes.

BACKGROUND

Games of chance typically associate a winning event with a specific game outcome. For example, achievement of BAR BAR BAR on the payline of a three reel slot machine might pay 20 credits on a 1 credit wager. To increase player interest, bonus awards, which are won independently of any base game outcomes, are sometimes offered. If a bonus occurs during a base game outcome, the award associated with the bonus is typically paid above and beyond the award based on the base game outcome. Bonuses, in their generic sense, can take many forms.

A “mystery” bonus is a popular bonus award that is so named because players cannot easily discern why the award occurred, as it is completely independent of the game’s normal schedule of payments. Typically, in a mystery bonus, a maximum bonus period is defined, often in terms of the number of games played or amount of coin-in. A value within that bonus period is selected, which becomes the mystery trigger. Generally the mystery trigger will be randomly selected between a minimum and the maximum value, but the selection may also be weighted toward a particular portion of the bonus period or selected pseudo randomly. For example, if the bonus period is defined as a period of 200 games played, the mystery trigger may be selected to be triggered at the $117^{th}$ game. When play commences at the first game of the bonus period, a mystery counter increments a count and continues to increase the count for each game played during the bonus period. The player may know the maximum number of games during which the mystery bonus must be awarded, but the player never knows for certain when the mystery trigger will be satisfied. Mystery bonuses are therefore increasingly likely to be won with each game played.

Bonuses can also be based on game outcome, but are paid over and above a standard game pay table. For instance, as described above, a base game may pay 20 credits on a 1 credit wager for the game outcome of BAR BAR BAR. Oftentimes, bonuses are implemented to give the player an additional incentive to play in a particular location or at a particular time. In a game-outcome based bonus, an additional award is provided to the player for achieving a particular game outcome or one of a set of outcomes. For instance, a casino may run a promotion during which the BAR BAR BAR outcome pays an additional 5 credits on a 1 credit wager. The winning player would then be awarded the 20 credits from the standard base game paytable, as well as an additional 5 credits bonus for playing during a special bonus period. A casino may offer bonus periods to promote play during typical slack periods, for example on weekday afternoons.

The amount of a bonus award can also take many forms. In a simple implementation, like the one described above, the bonus is a static award, 5 credits in this example. A progressive bonus, conversely, is one that increases over time during the bonus period based on the amount of each wager made during the bonus period until the progressive award is finally won. In a standard progressive, a small portion of each wager funds a progressive pool. Generally many gaming devices are coupled together and all contribute a small portion of their wagers to the pool, so that the progressive award grows with each wager placed on any of the connected gaming devices. The pools may be formed of a relatively few coupled gaming devices, all of the gaming devices in a single casino, all of the gaming devices in a multi-property casino, and in, some instances, all of the gaming devices within an entire gaming region. The current amount of the progressive pool is typically advertised to the player on a display, which continuously changes as the amount in the progressive pool grows.

Winning a standard progressive is usually based on game outcome. In such a system, a particular game outcome, such as JACKPOT JACKPOT JACKPOT is selected as the progressive trigger. When a player hits the base game outcome, he or she wins the base game award and additionally is credited with the amount of the progressive. Usually the progressive trigger is selected as one that is infrequently won, so that the progressive award grows for a relatively long time, and reaches a relatively high value before it is won. This builds excitement for players and incentivizes them to play the games coupled to a progressive bonus.

A progressive award may also be triggered in the “mystery” fashion described above, and not based on game outcome. In a mystery progressive a bonus period is defined by a starting and ending (maximum) value. The award must be won before the award grows larger than the maximum value. A winning amount W is randomly selected from within the range of all values between the starting and ending award values. For example, a mystery progressive starts at $1,000.00 and ends at $5,000.00. A winning value W is chosen from the range of numbers between $1,000.00 and $5,000.00. For example, W may be chosen to be $2,431.56. The progressive award value is initially set to the starting value of the award range, $1,000.00, and increases with each wager as a function of the wager size. A commonly used embodiment adds a percentage of each wager amount, for example, 3% of wager size. For example if a player wagers $3.00, 3% of the wager, or 9 cents, is added to the progressive award so that the current value grows to $1,000.09. The current award amount is then tested against the current value of W. Since $1,000.09 is less than $2,431.56, the test fails and the player does not win the mystery progressive.

This process continues until cumulative play brings the award to $2,431.56, making the comparison to the previously selected winning amount, W, true. When the mystery trigger is satisfied, the player who made the wager that satisfied the trigger is identified and awarded the mystery progressive.

A problem exists in that, directly after a progressive award is won, the reset starting amount is lower, and typically much lower than the large number that had just been displayed and won. For example, a large progressive may have risen to over $100,000 before being won, and, after being won, resets to $1000. The incentive to play for a chance to win $1000 is obviously much lower than the incentive to play for a higher amount. This is true both in game-outcome-based triggers, where the likelihood of winning is the same with each game played, as well as in mystery-based triggers, where the likelihood of winning is actually lower at the beginning of a mystery period compared to the end of the period.

Embodiments of the invention address these and other limitations in the prior art.

DETAILED DESCRIPTION

Figure 1A:
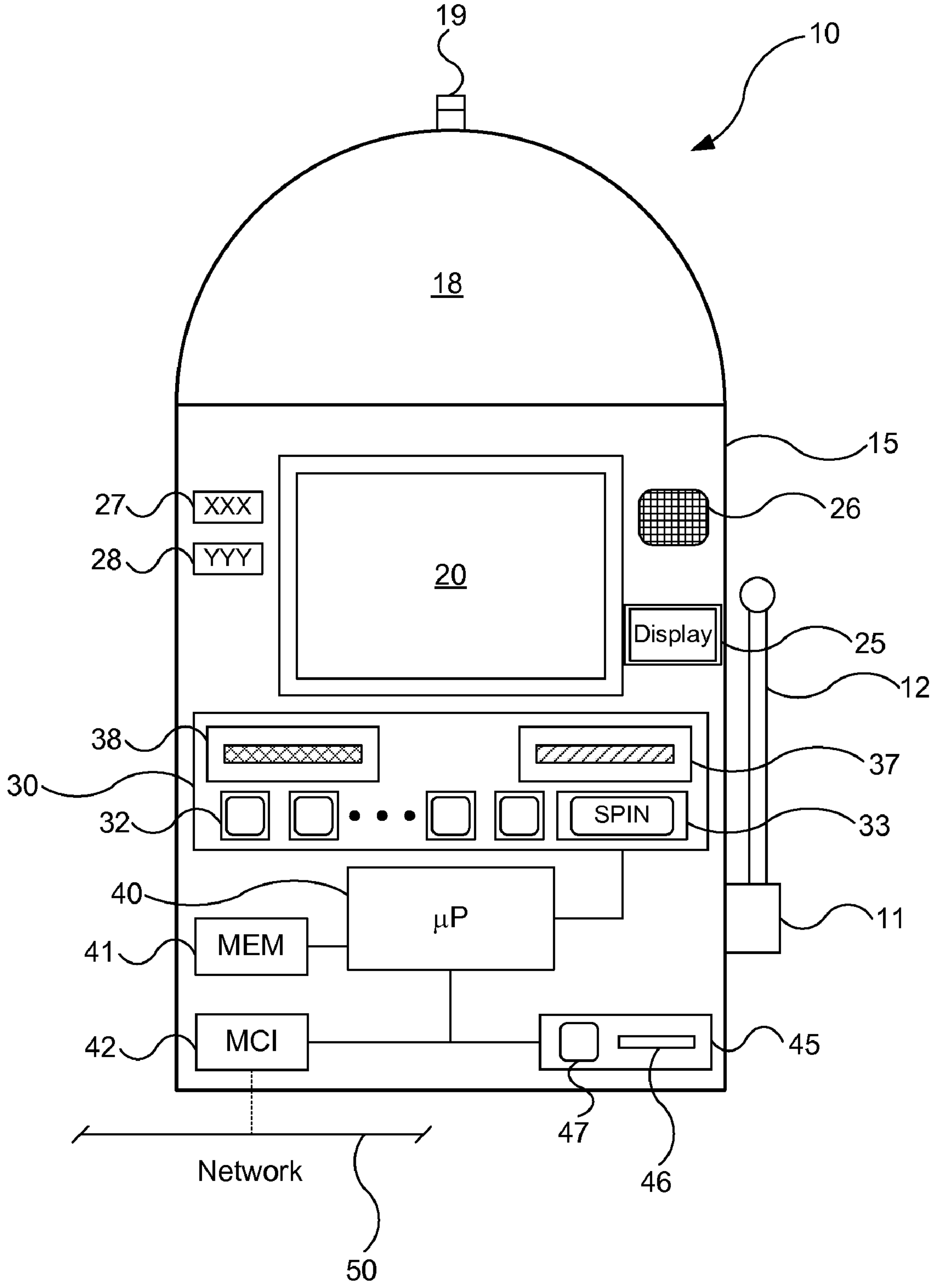
FIG. 1A is a functional block diagram that illustrates a gaming device according to embodiments of the invention.
Figure 1B:
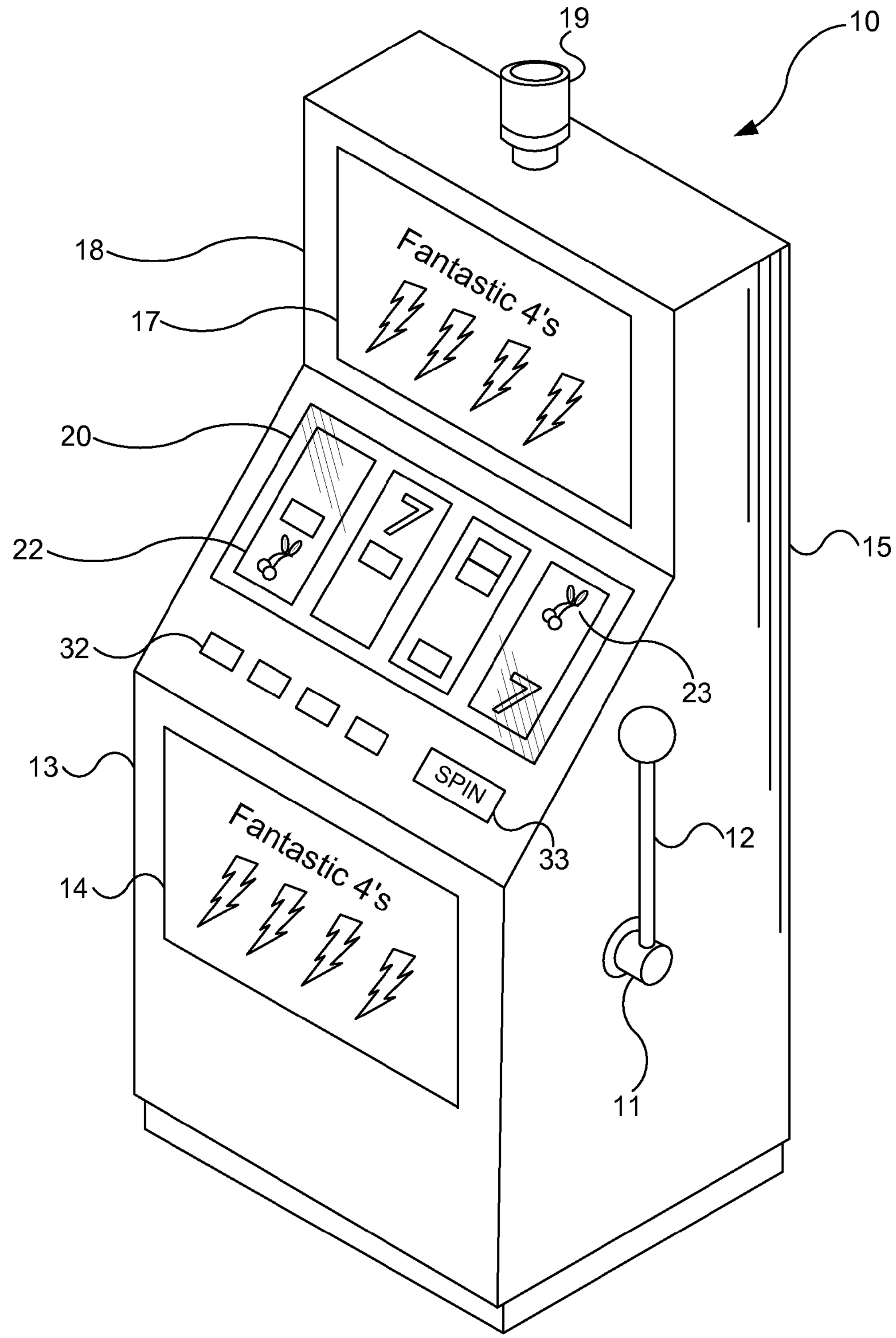
FIG. 1B is an isometric view of the gaming device illustrated in FIG. 1A.

FIGS. 1A and 1B illustrate example gaming devices according to embodiments of the invention.

Referring to FIGS. 1A and 1B, a gaming device 10 is an electronic gaming machine. Although an electronic gaming machine or "slot" machine is illustrated, various other types of devices may be used to wager monetarily based credits on a game of chance in accordance with principles of the invention. The term "electronic gaming device" is meant to include various devices such as electro-mechanical spinning-reel type slot machines, video slot machines, and video poker machines, for instance. Other gaming devices may include computer-based gaming machines, wireless gaming devices, multi-player gaming stations, modified personal electronic gaming devices (such as cell phones), personal computers, server-based gaming terminals, and other similar devices. Although embodiments of the invention will work with all of the gaming types mentioned, for ease of illustration the present embodiments will be described in reference to the electronic gaming machine 10 shown in FIGS. 1A and 1B.

The gaming device 10 includes a cabinet 15 housing components to operate the gaming device 10. The cabinet 15 may include a gaming display 20, a base portion 13, a top box 18, and a player interface panel 30. The gaming display 20 may include mechanical spinning reels (FIG. 2A), a video display (FIGS. 2B and 2C), or a combination of both spinning reels and a video display (not shown). The gaming cabinet 15 may also include a credit meter 27 and a coin-in or bet meter 28. The credit meter 27 may indicate the total number of credits remaining on the gaming device 10 that are eligible to be wagered. In some embodiments, the credit meter 27 may reflect a monetary unit, such as dollars. However, it is often preferable to have the credit meter 27 reflect a number of 'credits,' rather than a monetary unit. The bet meter 28 may indicate the amount of credits to be wagered on a particular game. Thus, for each game, the player transfers the amount that he or she wants to wager from the credit meter 27 to the bet meter 28. In some embodiments, various other meters may be present, such as meters reflecting amounts won, amounts paid, or the like. In embodiments where the gaming display 20 is a video monitor, the information indicated on the credit meters may be shown on the gaming display itself 20 (FIG. 2B).

The base portion 13 may include a lighted panel 14, a coin return (not shown), and a gaming handle 12 operable on a partially rotating pivot joint 11. The game handle 12 is traditionally included on mechanical spinning-reel games, where the handle may be pulled toward a player to initiate the spinning of reels 22 after placement of a wager. The top box 18 may include a lighted panel 17, a video display (such as an LCD monitor), a mechanical bonus device (not shown), and a candle light indicator 19. The player interface panel 30 may include various devices so that a player can interact with the gaming device 10.

The player interface panel 30 may include one or more game buttons 32 that can be actuated by the player to cause the gaming device 10 to perform a specific action. For example, some of the game buttons 32 may cause the gaming device 10 to bet a credit to be wagered during the next game, change the number of lines being played on a multi-line game, cash out the credits remaining on the gaming device (as indicated on the credit meter 27), or request assistance from casino personnel, such as by lighting the candle 19. In addition, the player interface panel 30 may include one or more game actuating buttons 33. The game actuating buttons 33 may initiate a game with a pre-specified amount of credits. On some gaming devices 10 a "Max Bet" game actuating button 33 may be included that places the maximum credit wager on a game and initiates the game. The player interface panel 30 may further include a bill acceptor 37 and a ticket printer 38. The bill acceptor 37 may accept and validate paper money or previously printed tickets with a credit balance. The ticket printer 38 may print out tickets reflecting the balance of the credits that remain on the gaming device 10 when a player cashes out by pressing one of the game buttons 32 programmed to cause a 'cashout.' These tickets may be inserted into other gaming machines or redeemed at a cashier station or kiosk for cash.

The gaming device 10 may also include one or more speakers 26 to transmit auditory information or sounds to the player. The auditory information may include specific sounds associated with particular events that occur during game play on the gaming device 10. For example, a particularly festive sound may be played during a large win or when a bonus is triggered. The speakers 26 may also transmit "attract" sounds to entice nearby players when the game is not currently being played.

The gaming device 10 may further include a secondary display 25. This secondary display 25 may be a vacuum fluorescent display (VFD), a liquid crystal display (LCD), a cathode ray tube (CRT), a plasma screen, or the like. The secondary display 25 may show any combination of primary game information and ancillary information to the player. For example, the secondary display 25 may show player tracking information, secondary bonus information, advertisements, or player selectable game options.

The gaming device 10 may include a separate information window (not shown) dedicated to supplying any combination of information related to primary game play, secondary bonus information, player tracking information, secondary bonus information, advertisements or player selectable game options. This window may be fixed in size and location or may have its size and location vary temporally as communication needs change. One example of such a resizable window is International Game Technology's "service window". Another example is Las Vegas Gaming Incorporated's retrofit technology which allows information to be placed over areas of the game or the secondary display screen at various times and in various situations.

The gaming device 10 includes a microprocessor 40 that controls operation of the gaming device 10. If the gaming device 10 is a standalone gaming device, the microprocessor 40 may control virtually all of the operations of the gaming devices and attached equipment, such as operating game logic stored in memory (not shown) as firmware, controlling the display 20 to represent the outcome of a game, communicating with the other peripheral devices (such as the bill acceptor 37), and orchestrating the lighting and sound emanating from the gaming device 10. In other embodiments where the gaming device 10 is coupled to a network 50, as described below, the microprocessor 40 may have different tasks depending on the setup and function of the gaming device. For example, the microprocessor 40 may be responsible for running the base game of the gaming device and executing instructions received over the network 50 from a bonus server or player tracking server. In a server-based gaming setup, the microprocessor 40 may act as a terminal to execute instructions from a remote server that is running game play on the gaming device.

The microprocessor 40 may be coupled to a machine communication interface (MCI) 42 that connects the gaming device 10 to a gaming network 50. The MCI 42 may be coupled to the microprocessor 40 through a serial connection, a parallel connection, an optical connection, or in some cases a wireless connection. The gaming device 10 may include memory 41 (MEM), such as a random access memory (RAM), coupled to the microprocessor 40 and which can be used to store gaming information, such as storing total coin-in statistics about a present or past gaming session, which can be communicated to a remote server or database through the MCI 42. The MCI 42 may also facilitate communication between the network 50 and the secondary display 25 or a player tracking unit 45 housed in the gaming cabinet 15.

The player tracking unit 45 may include an identification device 46 and one or more buttons 47 associated with the player tracking unit 45. The identification device 46 serves to identify a player, by, for example, reading a player-tracking device, such as a player tracking card that is issued by the casino to individual players who choose to have such a card. The identification device 46 may instead, or additionally, identify players through other methods. Player tracking systems using player tracking cards and card readers 46 are known in the art. Briefly summarizing such a system, a player registers with the casino prior to commencing gaming. The casino issues a unique player-tracking card to the player and opens a corresponding player account that is stored on a server or host computer, described below with reference to FIG. 3. The player account may include the player's name and mailing address and other information of interest to the casino in connection with marketing efforts. Prior to playing one of the gaming devices in the casino, the player inserts the player tracking card into the identification device 46 thus permitting the casino to track player activity, such as amounts wagered, credits won, and rate of play.

To induce the player to use the card and be an identified player, the casino may award each player points proportional to the money or credits wagered by the player. Players typically accrue points at a rate related to the amount wagered, although other factors may cause the casino to award the player various amounts. The points may be displayed on the secondary display 25 or using other methods. In conventional player tracking systems, the player may take his or her card to a special desk in the casino where a casino employee scans the card to determine how many accrued points are in the player's account. The player may redeem points for selected merchandise, meals in casino restaurants, or the like, which each have assigned point values. In some player tracking systems, the player may use the secondary display 25 to access their player tracking account, such as to check a total number of points, redeem points for various services, make changes to their account, or download promotional credits to the gaming device 10. In other embodiments, the identification device 46 may read other identifying cards (such as driver licenses, credit cards, etc.) to identify a player and match them to a corresponding player tracking account. Although FIG. 1A shows the player tracking unit 45 with a card reader as the identification device 46, other embodiments may include a player tracking unit 45 with a biometric scanner, PIN code acceptor, or other methods of identifying a player to pair the player with their player tracking account.

During typical play on a gaming device 10, a player plays a game by placing a wager and then initiating a gaming session. The player may initially insert monetary bills or previously printed tickets with a credit value into the bill acceptor 37. The player may also put coins into a coin acceptor (not shown) or a credit, debit or casino account card into a card reader/authorizer (not shown). In other embodiments, stored player points or special 'bonus points' awarded to the player or accumulated and/or stored in a player account may be able to be substituted at or transferred to the gaming device 10 for credits or other value. For example, a player may convert stored loyalty points to credits or transfer funds from his bank account, credit card, casino account or other source of funding. The selected source of funding may be selected by the player at time of transfer, determined by the casino at the time of transfer or occur automatically according to a predefined selection process. One of skill in the art will readily see that this invention is useful with all gambling devices, regardless of the manner in which wager value-input is accomplished.

The credit meter 27 displays the numeric credit value of the money or other value inserted, transferred, or stored dependent on the denomination of the gaming device 10. That is, if the gaming device 10 is a nickel slot machine and a $20 bill inserted into the bill acceptor 37, the credit meter will reflect 400 credits or one credit for each nickel of the inserted twenty dollars. For gaming devices 10 that support multiple denominations, the credit meter 27 will reflect the amount of credits relative to the denomination selected. Thus, in the above example, if a penny denomination is selected after the $20 is inserted the credit meter will change from 400 credits to 2000 credits.

A wager may be placed by pushing one or more of the game buttons 32, which may be reflected on the bet meter 28. That is, the player can generally depress a "bet one" button (one of the buttons on the player interface panel 30, such as 32), which transfers one credit from the credit meter 27 to the bet meter 28. Each time the button 32 is depressed an additional single credit transfers to the bet meter 28 up to a maximum bet that can be placed on a single play of the electronic gaming device 10. The gaming session may be initiated by pulling the gaming handle 12 or depressing the spin button 33. On some gaming devices 10, a "max bet" button (another one of the buttons 32 on the player interface panel 30) may be depressed to wager the maximum number of credits supported by the gaming device 10 and initiate a gaming session.

If the gaming session does not result in any winning combination, the process of placing a wager may be repeated by the player. Alternatively, the player may cash out any remaining credits on the credit meter 27 by depressing the "cash-out" button (another button 32 on the player interface panel 30), which causes the credits on the credit meter 27 to be paid out in the form of a ticket through the ticket printer 38, or may be paid out in the form of returning coins from a coin hopper (not shown) to a coin return tray.

If instead a winning combination (win) appears on the display 20, the award corresponding to the winning combination is immediately applied to the credit meter 27. For example, if the gaming device 10 is a slot machine, a winning combination of symbols 23 may land on a played payline on reels 22. If any bonus games are initiated, the gaming device 10 may enter into a bonus mode or simply award the player with a bonus amount of credits that are applied to the credit meter 27.

Figure 2A:
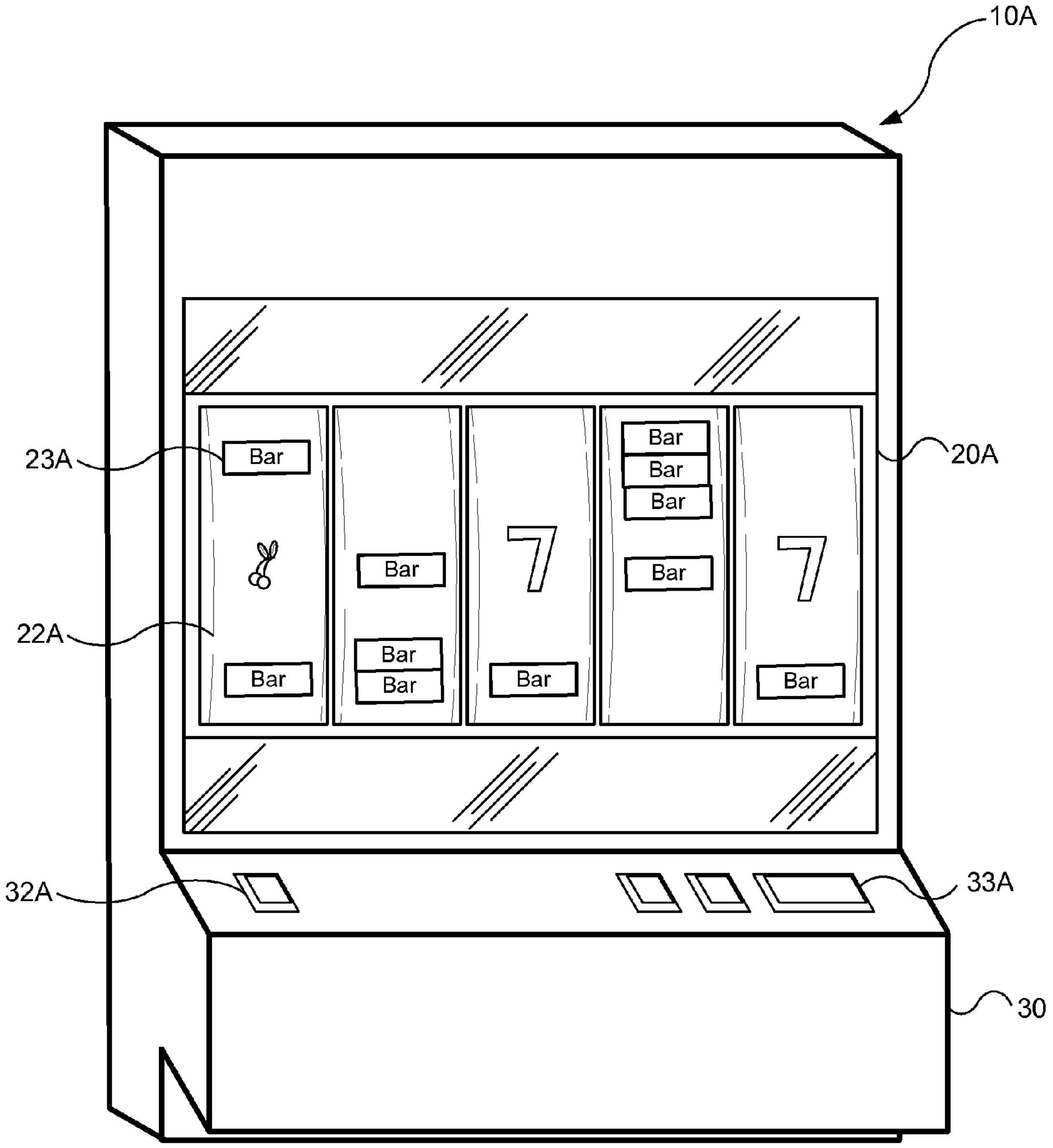
FIGS. 2A, 2B, and 2C are detail diagrams of exemplary types of gaming devices according to embodiments of the invention.
Figure 2B:
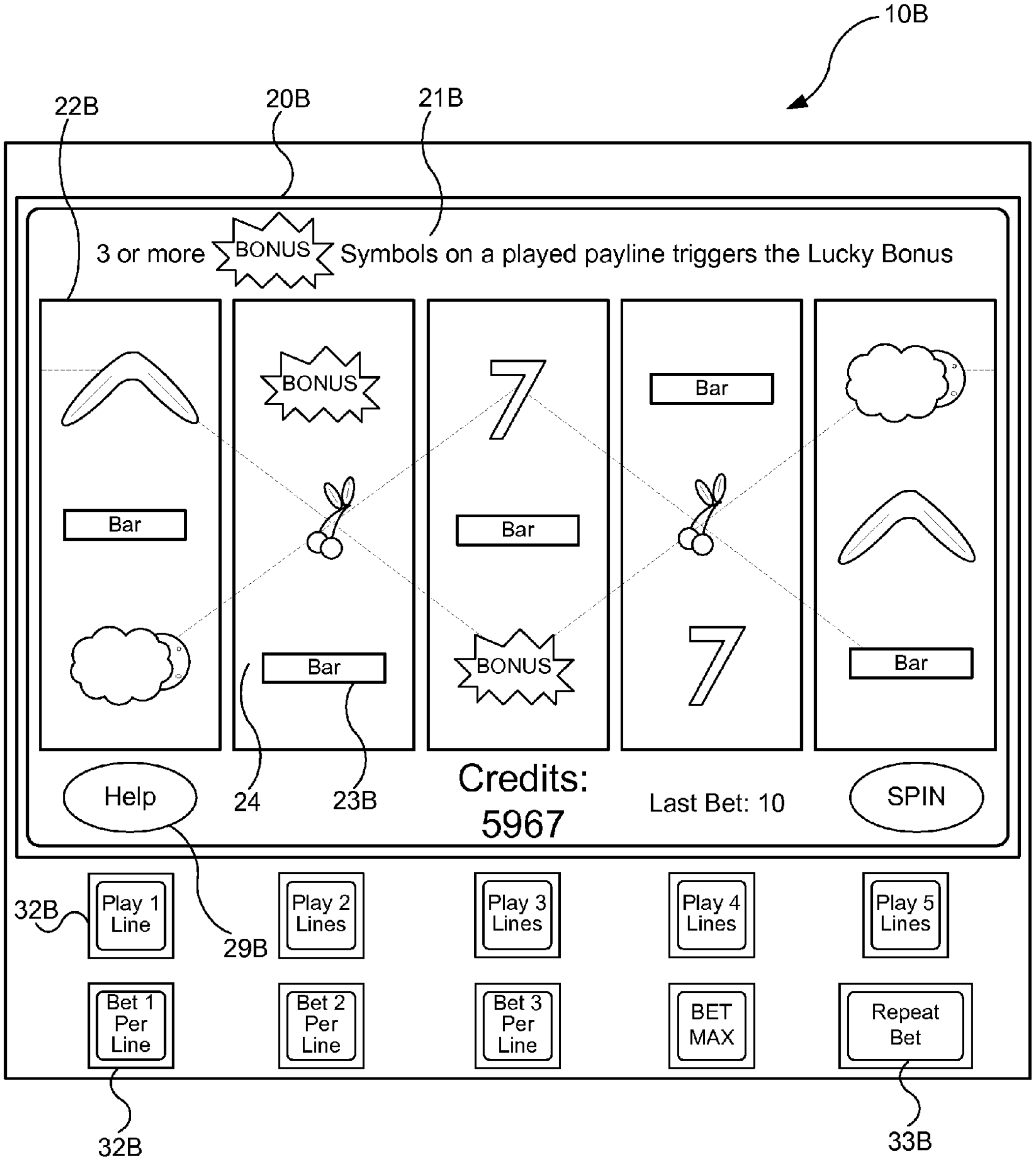
Figure 2C:
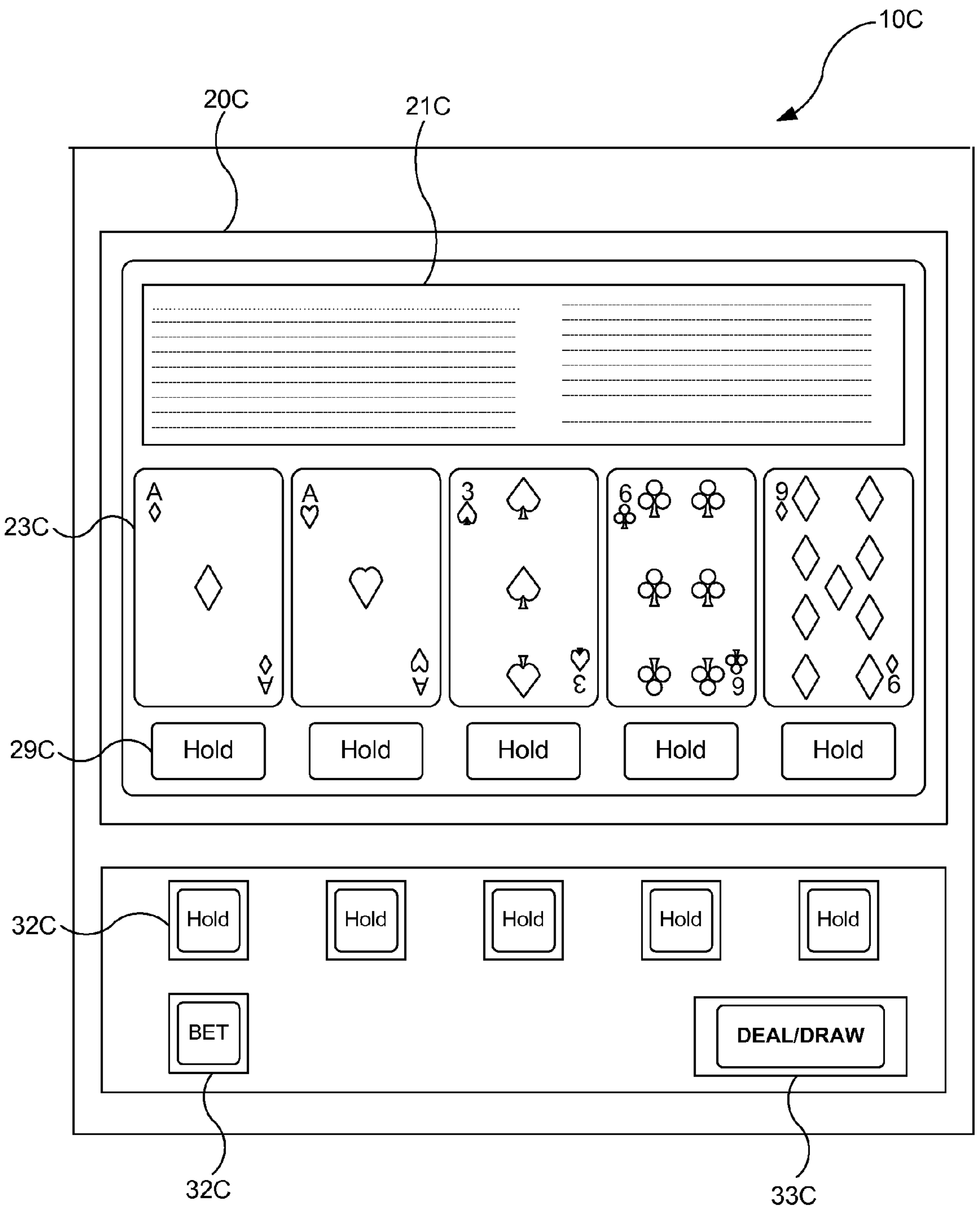

FIGS. 2A to 2C illustrate exemplary types of gaming devices according to embodiments of the invention. FIG. 2A illustrates an example spinning-reel gaming machine 10A, FIG. 2B illustrates an example video slot machine 10B, and FIG. 2C illustrates an example video poker machine 10C.

Referring to FIG. 2A, a spinning-reel gaming machine 10A includes a gaming display 20A having a plurality of mechanical spinning reels 22A. Typically, spinning-reel gaming machines 10A have three to five spinning reels 22A. Each of the spinning reels 22A has multiple symbols 23A that may be separated by blank areas on the spinning reels 22A, although the presence of blank areas typically depends on the number of reels 22A present in the gaming device 10A and the number of different symbols 23A that may appear on the spinning reels 22A. Each of the symbols 22A or blank areas makes up a "stop" on the spinning reel 22A where the reel 22A comes to rest after a spin. Although the spinning reels 22A of various games 10A may have various numbers of stops, many conventional spinning-reel gaming devices 10A have reels 22A with twenty two stops.

During game play, the spinning reels 22A may be controlled by stepper motors (not shown) under the direction of the microprocessor 40 (FIG. 1A). Thus, although the spinning-reel gaming device 10A has mechanical based spinning reels 22A, the movement of the reels themselves is electronically controlled to spin and stop. This electronic control is advantageous because it allows a virtual reel strip to be stored in the memory 41 of the gaming device 10A, where various "virtual stops" are mapped to each physical stop on the physical reel 22A. This mapping allows the gaming device 10A to establish greater awards and bonuses available to the player because of the increased number of possible combinations afforded by the virtual reel strips.

A gaming session on a spinning reel slot machine 10A typically includes the player pressing the "bet-one" button (one of the game buttons 32A) to wager a desired number of credits followed by pulling the gaming handle 12 (FIGS. 1A, 1B) or pressing the spin button 33A to spin the reels 22A. Alternatively, the player may simply press the "max-bet" button (another one of the game buttons 32A) to both wager the maximum number of credits permitted and initiate the spinning of the reels 22A. The spinning reels 22A may all stop at the same time or may individually stop one after another (typically from left to right) to build player anticipation. Because the display 20A usually cannot be physically modified, some spinning reel slot machines 10A include an electronic display screen in the top box 18 (FIG. 1B), a mechanical bonus mechanism in the top box 18, or a secondary display 25 (FIG. 1A) to execute a bonus.

Referring to FIG. 2B, a video gaming machine 10B may include a video display 20B to display virtual spinning reels 22B and various other gaming information 21B. The video display 20B may be a CRT, LCD, plasma screen, or the like. It is usually preferable that the video display 20B be a touchscreen to accept player input. A number of symbols 23A appear on each of the virtual spinning reels 22B. Although FIG. 2B shows five virtual spinning reels 22B, the flexibility of the video display 20B allows for various reel 22B and game configurations. For example, some video slot games 10B spin reels for each individual symbol position (or stop) that appears on the video display 20B. That is, each symbol position on the screen is independent of every other position during the gaming sessions. In these types of games, very large numbers of pay lines or multiple super scatter pays can be utilized since similar symbols could appear at every symbol position on the video display 20B. On the other hand, other video slot games 10B more closely resemble the mechanical spinning reel games where symbols that are vertically adjacent to each other are part of the same continuous virtual spinning reel 22B.

Because the virtual spinning reels 22B, by virtue of being computer implemented, can have almost any number of stops on a reel strip, it is much easier to have a greater variety of displayed outcomes as compared to spinning-reel slot machines 10A (FIG. 2A) that have a fixed number of physical stops on each spinning reel 22A.

With the possible increases in reel 22B numbers and configurations over the mechanical gaming device 10A, video gaming devices 10B often have multiple paylines 24 that may be played. By having more paylines 24 available to play, the player may be more likely to have a winning combination when the reels 22B stop and the gaming session ends. However, since the player typically must wager at least a minimum number of credits to enable each payline 24 to be eligible for winning, the overall odds of winning are not much different, if at all, than if the player is wagering only on a single payline. For example, in a five line game, the player may bet one credit per payline 24 and be eligible for winning symbol combinations that appear on any of the five played paylines 24. This gives a total of five credits wagered and five possible winning paylines 24. If, on the other hand, the player only wagers one credit on one payline 24, but plays five gaming sessions, the odds of winning would be identical as above: five credits wagered and five possible winning paylines 24.

Because the video display 20B can easily modify the image output by the video display 20B, bonuses, such as second screen bonuses are relatively easy to award on the video slot game 10B. That is, if a bonus is triggered during game play, the video display 20B may simply store the resulting screen shot in memory and display a bonus sequence on the video display 20B. After the bonus sequence is completed, the video display 20B may then retrieve the previous screen shot and information from memory, and re-display that image.

Also, as mentioned above, the video display 20B may allow various other game information 21B to be displayed. For example, as shown in FIG. 2B, banner information may be displayed above the spinning reels 22B to inform the player, perhaps, which symbol combination is needed to trigger a bonus. Also, instead of providing a separate credit meter 27 (FIG. 1A) and bet meter 28, the same information can instead be displayed on the video display 20B. In addition, "soft buttons" 29B such as a "spin" button or "help/see pays" button may be built using the touch screen video display 20B. Such customization and ease of changing the image shown on the display 20B adds to the flexibility of the game 10B.

Even with the improved flexibility afforded by the video display 20B, several physical buttons 32B and 33B are usually provided on video slot machines 10B. These buttons may include game buttons 32B that allow a player to choose the number of paylines 24 he or she would like to play and the number of credits wagered on each payline 24. In addition, a max bet button (one of the game buttons 32B) allows a player to place a maximum credit wager on the maximum number of available paylines 24 and initiate a gaming session. A repeat bet or spin button 33B may also be used to initiate each gaming session when the max bet button is not used.

Referring to FIG. 2C, a video poker gaming device 10C may include a video display 20C that is physically similar to the video display 20B shown in FIG. 2B. The video display 20C may show a poker hand of five cards 23C and various other player information 21C including a paytable for various winning hands, as well as a plurality of player selectable soft buttons 29C. The video display 20C may present a poker hand of five cards 23C and various other player information 21C including a number of player selectable soft (touch-screen) buttons 29C and a paytable for various winning hands. Although the embodiment illustrated in FIG. 3C shows only one hand of poker on the video display 20C, various other video poker machines 10C may show several poker hands (multi-hand poker). Typically, video poker machines 10C play "draw" poker in which a player is dealt a hand of five cards, has the opportunity to hold any combination of those five cards, and then draws new cards to replace the discarded ones. All pays are usually given for winning combinations resulting from the final hand, although some video poker games 10C may give bonus credits for certain combinations received on the first hand before the draw. In the example shown in FIG. 2C a player has been dealt two aces, a three, a six, and a nine. The video poker game 10C may provide a bonus or payout for the player having been dealt the pair of aces, even before the player decides what to discard in the draw. Since pairs, three of a kind, etc. are typically needed for wins, a player would likely hold the two aces that have been dealt and draw three cards to replace the three, six, and nine in the hope of receiving additional aces or other cards leading to a winning combination with a higher award amount. After the draw and revealing of the final hand, the video poker game 10C typically awards any credits won to the credit meter.

The player selectable soft buttons 29C appearing on the screen respectively correspond to each card on the video display 20C. These soft buttons 29C allow players to select specific cards on the video display 20C such that the card corresponding to the selected soft button is "held" before the draw. Typically, video poker machines 10C also include physical game buttons 32C that correspond to the cards in the hand and may be selected to hold a corresponding card. A deal/draw button 33C may also be included to initiate a gaming session after credits have been wagered (with a bet button 32C, for example) and to draw any cards not held after the first hand is displayed.

Although examples of a spinning reel slot machine 10A, a video slot machine 10B, and a video poker machine 10C have been illustrated in FIGS. 2A-2C, gaming machines and various other types of gaming devices known in the art are contemplated and are within the scope of the invention.

Figure 3:
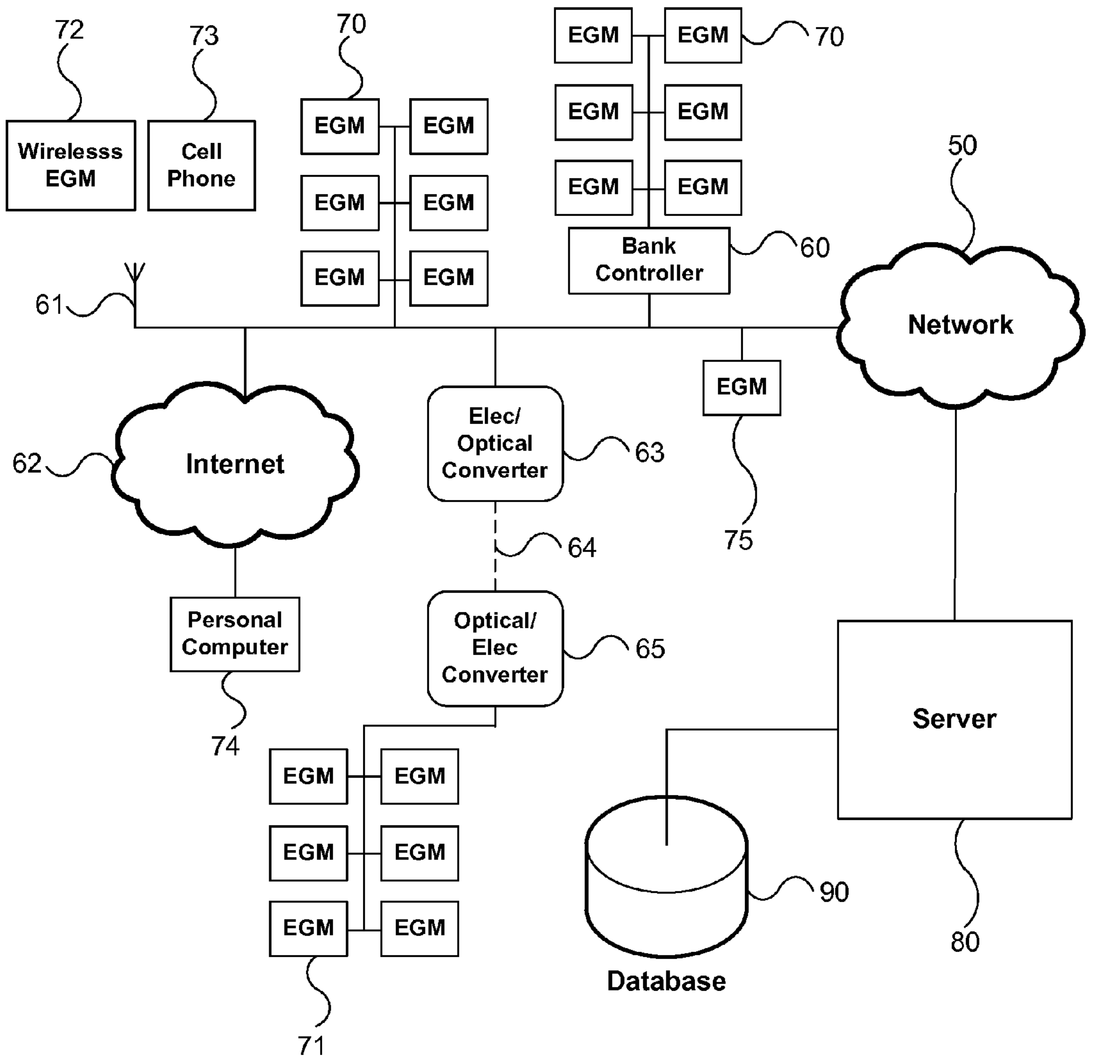
FIG. 3 is a functional block diagram of networked gaming devices according to embodiments of the invention.

FIG. 3 is a block diagram illustrating networked gaming devices according to embodiments of the invention. Referring to FIG. 3, multiple electronic gaming devices (EGMs) 70, 71, 72, 73, 74, and 75 may be coupled to one another and coupled to a remote server 80 through a network 50. For ease of understanding, gaming devices or EGMs 70, 71, 72, 73, 74, and 75 are generically referred to as EGMs 70-75. The term EGMs 70-75, however, may refer to any combination of one or more of EGMs 70, 71, 72, 73, 74, and 75. Additionally, the gaming server 80 may be coupled to one or more gaming databases 90. These gaming network 50 connections may allow multiple gaming devices 70-75 to remain in communication with one another during particular gaming modes such as tournament play or remote head-to-head play. Although some of the gaming devices 70-75 coupled on the gaming network 50 may resemble the gaming devices 10, 10A, 10B, and 10C shown in FIGS. 1A-1B and 2A-2C, other coupled gaming devices 70-75 may include differently configured gaming devices. For example, the gaming devices 70-75 may include traditional slot machines 75 directly coupled to the network 50, banks of gaming devices 70 coupled to the network 50, banks of gaming devices 70 coupled to the network through a bank controller 60, wireless handheld gaming machines 72 and cell phones 73 coupled to the gaming network 50 through one or more wireless routers or antennas 61, personal computers 74 coupled to the network 50 through the internet 62, and banks of gaming devices 71 coupled to the network through one or more optical connection lines 64. Additionally, some of the traditional gaming devices 70, 71, and 75 may include electronic gaming tables, multi-station gaming devices, or electronic components operating in conjunction with non-gaming components, such as automatic card readers, chip readers, and chip counters, for example.

Gaming devices 71 coupled over an optical line 64 may be remote gaming devices in a different location or casino. The optical line 64 may be coupled to the gaming network 50 through an electronic to optical signal converter 63 and may be coupled to the gaming devices 71 through an optical to electronic signal converter 65. The banks of gaming devices 70 coupled to the network 50 may be coupled through a bank controller 60 for compatibility purposes, for local organization and control, or for signal buffering purposes. The network 50 may include serial or parallel signal transmission lines and carry data in accordance with data transfer protocols such as Ethernet transmission lines, Rs-232 lines, firewire lines, USB lines, or other communication protocols. Although not shown in FIG. 3, substantially the entire network 50 may be made of fiber optic lines or may be a wireless network utilizing a wireless protocol such as IEEE 802.11 a, b, g, or n, Zigbee, RF protocols, optical transmission, near-field transmission, or the like.

As mentioned above, each gaming device 70-75 may have an individual processor 40 (FIG. 1A) and memory 41 to run and control game play on the gaming device 70-75, or some of the gaming devices 70-75 may be terminals that are run by a remote server 80 in a server based gaming environment. Server based gaming environments may be advantageous to casinos by allowing fast downloading of particular game types or themes based on casino preference or player selection. Additionally, tournament based games, linked games, and certain game types, such as BINGO or keno may benefit from at least some server 80 based control.

Thus, in some embodiments, the network 50, server 80, and database 90 may be dedicated to communications regarding specific game or tournament play. In other embodiments, however, the network 50, server 80, and database 90 may be part of a player tracking network. For player tracking capabilities, when a player inserts a player tracking card in the card reader 46 (FIG. 1A), the player tracking unit 45 sends player identification information obtained on the card reader 46 through the MCI 42 over the network 50 to the player tracking server 80, where the player identification information is compared to player information records in the player database 90 to provide the player with information regarding their player account or other features at the gaming device 10 where the player is wagering. Additionally, multiple databases 90 and/or servers 80 may be present and coupled to one or more networks 50 to provide a variety of gaming services, such as both game/tournament data and player tracking data.

The various systems described with reference to FIGS. 1-3 can be used in a number of ways. For instance, the systems can be used to track data about various players. The tracked data can be used by the casino to provide additional benefits to players, such as extra bonuses or extra benefits such as bonus games and other benefits as described above. These added benefits further entice the players to play at the casino that provides the benefits.

Figure 4:
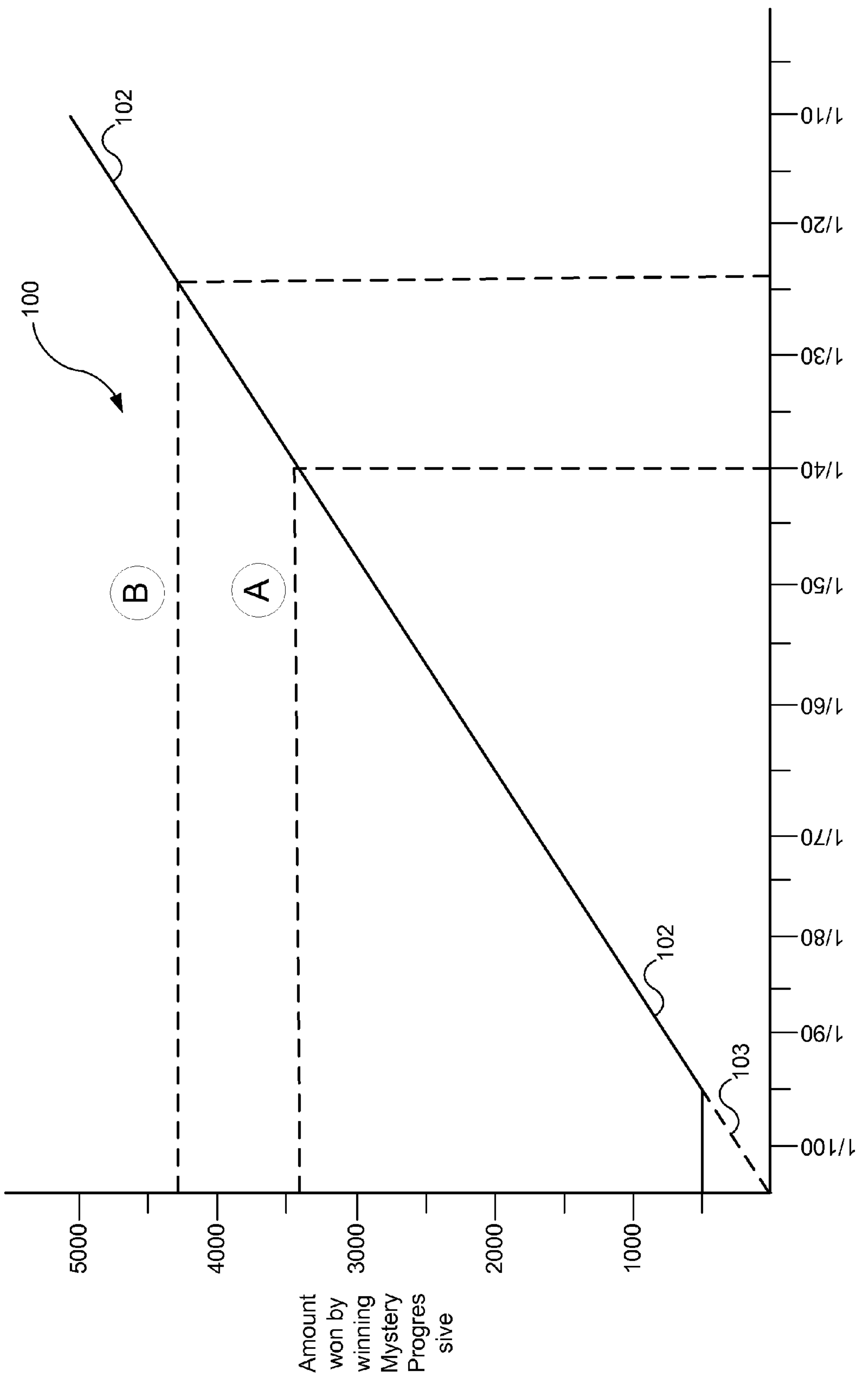
FIG. 4 (Prior Art)
FIG. 4 is a graph of a known mystery progressive award.

FIG. 4A is a graph depicting the odds of winning a progressive mystery bonus in relation to the amount won as is known in the art. A graph 100 includes two axes, an X-axis that illustrates a likelihood of winning a mystery progressive bonus, as well as a Y-axis that depicts an amount won by winning the mystery progressive. An award line 102 shows the particular outcomes. Assume, for purposes of discussion, that the mystery progressive period is one hundred games long. Therefore, at the first game played during the mystery period, there is 1 in 100 chance of winning the progressive, as indicated in the left-most indication on the X-axis. Assuming the player did not win the mystery progressive in the first game, the player now has a 1 in 99 chance of winning the mystery progressive during the second game, because there are only 99 more chances to win the mystery progressive before it is guaranteed to win by the $100^{th}$ game. After playing ten games, the player has a 1 in 90 chance of winning the mystery progressive, as illustrated on the graph 100. This change in the likelihood of winning the mystery progressive continues until the very last game. At that point, if the bonus period has not ended earlier, the player has played ninety-nine times during the mystery bonus period without a win. The next game has a 1 in 1 chance of winning the mystery progressive because the rules describing the mystery progressive bonus determined that it must be won within 100 games. Therefore, looking at the X-axis of graph 100, a player has the lowest chance of winning a mystery progressive in the first game after a prior win, and this chance steadily increases until the last game of the mystery progressive period, when the player has a guaranteed, or a 1 in 1 chance, of winning the progressive.

The Y-axis in graph 100 indicates an example amount of hypothetical winnings for a player who wins the mystery progressive. Recall that a progressive award typically increases as a function of the cumulative amounts wagered during the mystery progressive period. In some embodiments, the amount won may literally begin with 0, as indicated with a dashed extension 103 to the award line 102 in the graph 100. In more typical embodiments, a floor, such as $500, is initially established so that a player winning on even the first play of the mystery progressive period wins a substantial award.

In an example illustration, assume that the winning mystery trigger was selected to be the 60th game played during the mystery progressive period. In such an example, players of games connected to the mystery progressive bonus continue playing their games as the progressive award increases, and are therefore eligible for the bonus as well. At the 60th game, illustrated in the graph 100 as line A, the mystery trigger is satisfied and the winning player wins the corresponding amount. In this instance, the winning amount is $3,000.00.

In another embodiment, instead of a particular game number being selected as the winning mystery trigger, a winning amount is selected as the winning trigger of the mystery progressive. For example, as illustrated in the graph 100, assume that a mystery trigger was selected to be $4,250.00, as illustrated on line B of graph 100. According to the graph 100, this winning trigger would be satisfied on approximately the $76^{th}$, or when the player had a 1 in 24 chance of winning Therefore, once the mystery pool increased to $4,250.00, by virtue of wagers made, that amount would be awarded to the player whose wager satisfied the trigger.

As mentioned above, the award line 102 on the graph 100 indicates the amount won in the mystery progressive for each game played in the mystery progressive bonus. Different implementations of a mystery progressive may have differently sloped award lines, depending on how the mystery progressive is funded. For example, if five percent of the wagers were added to the mystery progressive rather than the more typical three percent, then the award line 102 would have a steeper slope on the graph 100.

Figure 5A:
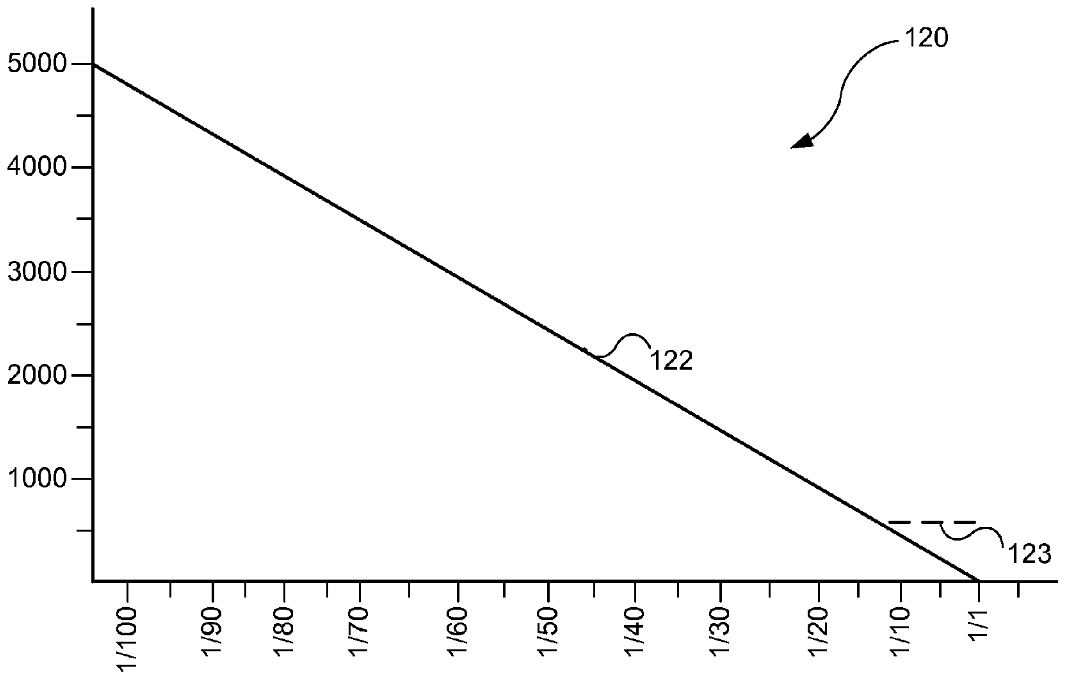
FIGS. 5A, 5B, 5C, and 5D are graphs of example mystery degressive bonus awards according to embodiments of the invention.

Illustrated in FIG. 5A is a graph 120 illustrating odds of winning a degressive mystery bonus depicted against an amount won by the winner according to embodiments of the invention. In the graph 120, an award line 122 indicates the amount won by a player for each of the odds of winning Although the award line 122 is depicted as a continuous line, for ease of discussion, it may actually be composed of a number of discrete points each aligning with one of the particular odds of winning Different than the standard mystery progressive illustrated in FIG. 4, in the degressive bonus illustrated in FIG. 5A, the player is awarded less, rather than more, for winning later in the mystery degressive bonus period.

As illustrated in the graph 120, in the first game of the mystery degressive bonus period, the player has a 1 in 100 chance of winning the mystery degressive, which, if won, would cause a $5,000.00 bonus award to be delivered to the player. With each successive game played in the mystery degressive, as the likelihood of winning goes up, the amount awarded to the player for winning goes down. As illustrated in FIG. 5A, at the 50th game play of the mystery degressive bonus, the player would win $2500.00. This progression continues along the award line 122 until the last possible game in the degressive bonus, where the player is guaranteed to win, by virtue of having a 1 in 1 chance of winning.

In a straightforward embodiment, the award line 122 continues all the way to a zero award when the odds of winning are 1 to 1. In other embodiments, however, as illustrated by an extension award line 123, the amount awarded does not decrease all the way to zero, but rather reaches a predetermined minimum amount, for instance $500.00. Such an embodiment is a direct analogue to the embodiment described with reference to FIG. 4 that begins at the illustrated non-zero amount. Of course, also as described with reference to FIG. 4, the slope of the line 122 of the graph 120 may take any value, which is determined by the party implementing the mystery degressive bonus.

Figure 5B:
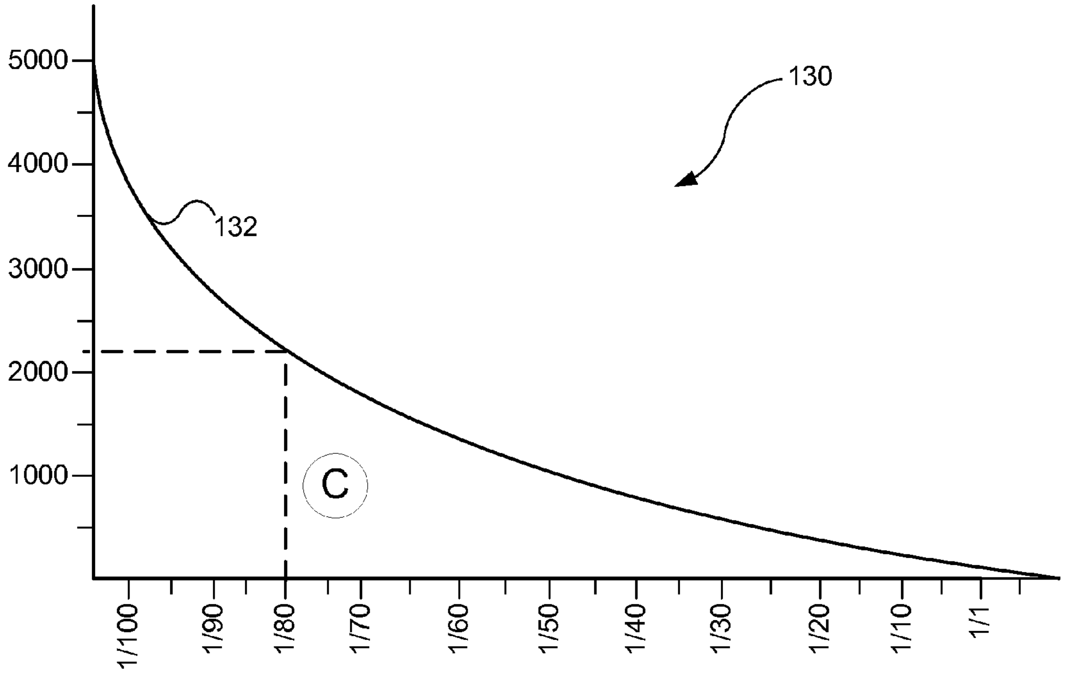
Figure 5C:
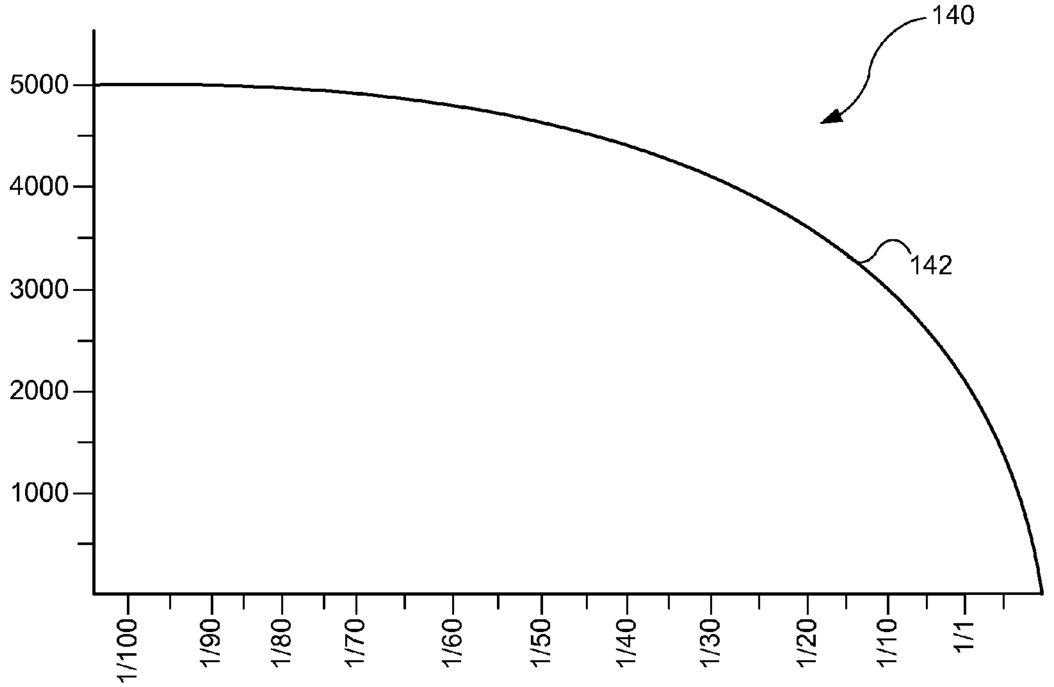

Although the slope of the award line 122 in FIG. 5A is linear, in other embodiments it need not be. For example, in the embodiment illustrated in FIG. 5B, an award 132 on a graph 130 has a generally decreasing but nonlinear slope. In this embodiment, an amount won by a player of the mystery degressive falls relatively rapidly in the beginning of the mystery degressive bonus period as compared to the end of the game. For instance, as illustrated on line C of the graph 130, at the $20^{th}$ play in the mystery degressive bonus, i.e., when the player has a 1 in 80 chance of winning the mystery bonus, the amount won would be approximately $2,250.00. In contrast, in the embodiment illustrated in FIG. 5A, if a player wins the mystery degressive on the twentieth game, the player would win $3,750.00. Using an embodiment such as that illustrated in FIG. 5B, a casino may have the benefit of enticing a number of players to play the mystery degressive when the potential winnings are quite high, but when the likelihood of winning is quite low. Then, as the likelihood of winning increases, the amount paid to the winner of the degressive bonus strongly decreases. This may have the effect of attracting many players to play the game but paying out comparatively less than the embodiment illustrated in FIG. 5A. A related example is illustrated in a graph 140 of FIG. 5C, in which an amount paid line 142 decreases very slowly in the early portions of the mystery degressive bonus, but decreases rapidly in the later portions of the game.

Figure 5D:

FIG. 5D presents yet another graph 150 showing another example implementation of a mystery degressive bonus according to embodiments of the invention. In this example, the amount of potential winnings decreases over time as the likelihood of winning the mystery degressive increases, however, the amount is decreased in step-wise fashion as illustrated by the award line 152. Such an embodiment may be easier to implement than one that pays out as a function of the amount wagered during the mystery degressive bonus. Instead, the embodiment illustrated in the graph 150 can be implemented using simple decrementers and counters. Also, similar to the embodiment described above, the award line 152 may include a guaranteed minimum win, as illustrated by an extension award line 153.

Although the above embodiments were described with reference to a monetary award for winning the mystery degressive bonus, those skilled in the art realize that anything of value to a player, such as credits, free spins, coupons or vouchers, etc., may by substituted for the monetary value depicted on the Y-axis and provided to the winner of the mystery degressive bonus.

Figure 6A:
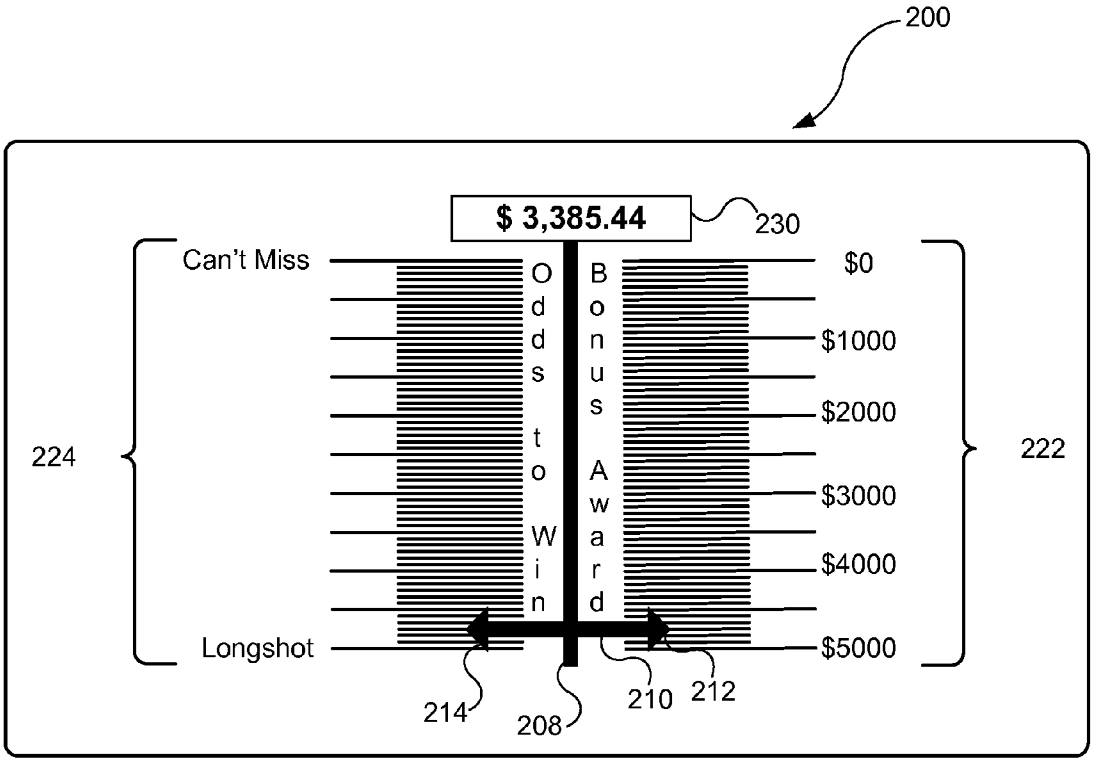
FIGS. 6A and 6B are block diagrams of example mystery degressive bonus award displays according to embodiments of the invention.

FIG. 6A is a depiction of a degressive meter 200 according to embodiments of the invention. The degressive meter 200 may be presented on any of the displays that are a part of or attached to the gaming device 10 (FIG. 1A), such as the gaming display 20, secondary display 25, or a display in conjunction with the player tracking unit 45. In other embodiments the degressive meter is a physical device attached to or displayed near the gaming device as described below.

In the degressive meter 200, a track 208 provides a guide for a moveable double-headed pointer 210. The pointer 210 includes a first indicator end 212 that points to a present amount of a bonus award, as well as a second indicator end 214 that indicates a likelihood of winning a degressive mystery bonus by playing the next game of a gaming device that is participating in the bonus.

When the mystery degressive begins, the pointer 210 is reset into the lowest position of the track 208, where, the indicator 212 informs the player that he or she has a chance to win $5,000.00 as a bonus by playing the next game. Simultaneously, the indicator 214 informs the player that the likelihood of winning the $5000 bonus is "longshot," or, in other words, very unlikely.

As the mystery degressive bonus continues, the pointer 210 rises vertically in the track 208, in lockstep, which indicates that the players odds of winning the mystery degressive bonus are increasing at the same time the potential amount won is decreasing. Additionally, the degressive meter 200 can be used in conjunction with or include its own progressive meter 230. As described above, a progressive meter indicates an amount of potential winnings should the trigger condition be satisfied. In this embodiment, any amount won in the degressive mystery bonus would be added to the total of the progressive meter 230, for a combined bonus to the player.

In operation, such a mystery bonus system as described with reference to FIG. 6A may be used to overcome an initial player reluctance to play a game that includes a progressive bonus in its early stages of progression. In other words, to overcome the unwillingness of a player to play on a machine having a bonus that was recently reset, or otherwise showing a relatively low amount, the degressive meter 200 informs such a player that the player will collect the total of the progressive meter and the degressive bonus. In alternate embodiments a separate total box (not shown) could add the degressive bonus number to the progressive meter 230 to readily inform the player of the potential win.

Depending on how the mystery degressive bonus and the progressive bonus are configured, the mystery degressive may be decremented at exactly the same rate that the progressive bonus increments, which has the effect of establishing a constant floor amount that the player could win. In other embodiments, the degressive may decrease slower than the progressive is increasing, thus giving a net bonus to the player. In yet another embodiment, the mystery degressive bonus could decrease faster than the progressive bonus is increasing, having the effect of a shrinking award as the games proceed.

Figure 6B:
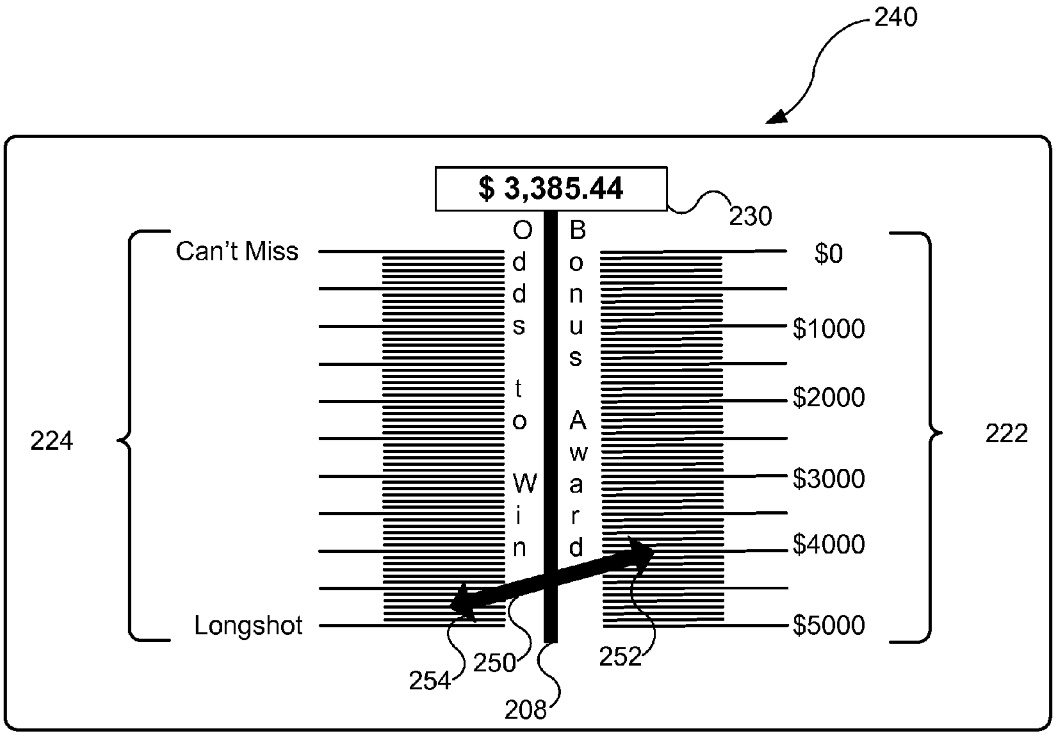

In another embodiment, illustrated in FIG. 6B, a degressive meter 240 has a double-headed pointer 250 that includes independently positionable indicators 252, 254. In this embodiment, the pointer 250 can rotate clockwise or counterclockwise from a horizontal orientation as the double-headed pointer 250 rises within the track 208. As the double-headed pointer 250 rotates counterclockwise from horizontal, the degressive meter 240 indicates that the potential amount won by the player is dropping faster than the odds of winning the mystery degressive are increasing. This corresponds to the embodiment illustrated in FIG. 5B above. Conversely, when the double-headed pointer 250 rotates clockwise from the horizontal position as it raises in the track 208, the degressive meter 240 indicates that the potential amount won decreases less rapidly even as the odds of winning the mystery degressive increase. Such an embodiment is a visual indication to the player of the embodiment illustrated above with reference to FIG. 5C. Of course, with the embodiment illustrated with reference to 6A, where the double-headed pointer 210 moves in lock step "vertically" along the track 208, the degressive meter 200 corresponds directly to the embodiment illustrated in FIG. 5A where the slope is constant.

As briefly described above, the degressive meter 200 may be made from mechanical components, including a linear motor that drives the pointer 210 within the slot 208. At reset, the motor (not shown) drives the pointer 210 to the bottom of the slot, which indicates the starting amount and odds of winning the degressive bonus. As the degressive bonus continues, the motor raises the pointer 210 within the slot. The degressive meter 240 additionally includes a rotation mechanism so that its independently positionable pointers 252, 254 need not always be horizontally aligned with their counterpart indicator. In some implementations each gaming device 10 includes its own degressive meter 200, 240, while in other implementations an overhead meter may be oriented such that multiple users (and others) can all see the meter simultaneously. Of course, the components and movements of both of these embodiments, and others, may be simulated in video and displayed on the gaming device 10 or on an overhead display.

Figure 7:
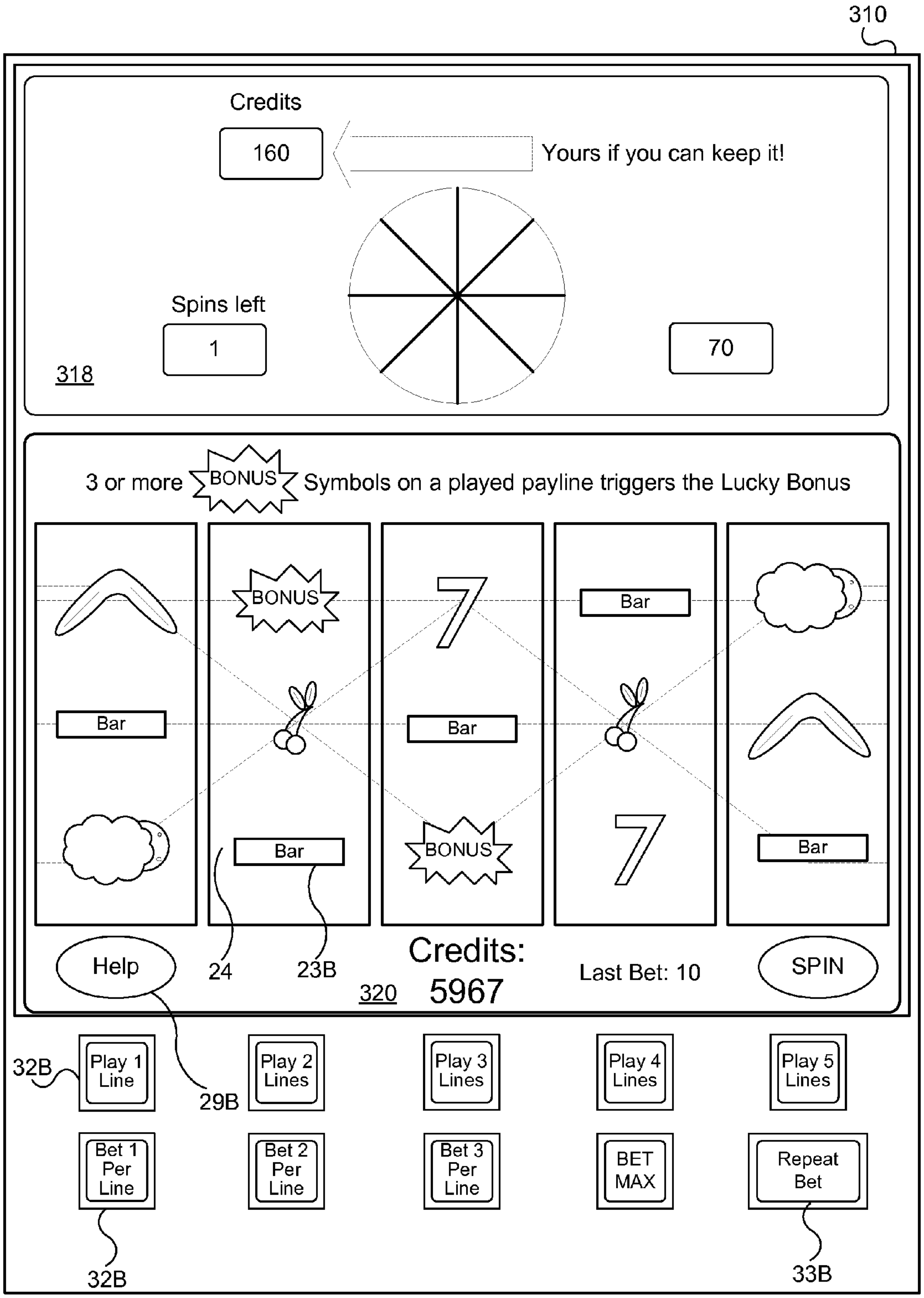
FIG. 7 is a block diagram of a gaming device that includes a degressive bonus according to embodiments of the invention.

FIG. 7 illustrates an embodiment of the invention that includes a bonus game using the degressive concept. In FIG. 7, a gaming device 310 includes a primary game in a gaming display 320 illustrated as a set of reels, as well as a bonus game illustrated in a secondary display 318. A screen on the display 318 communicates the bonus game to the player. Other components of the gaming device 310 may be the same as described above with reference to gaming device 10.

In this bonus game, a player is initially "awarded" an amount of money or credits. In this bonus, however, the player cannot immediately cash out, but rather must complete the bonus game to determine his or her final winnings before those winnings are provided to the player.

Figure 8A:
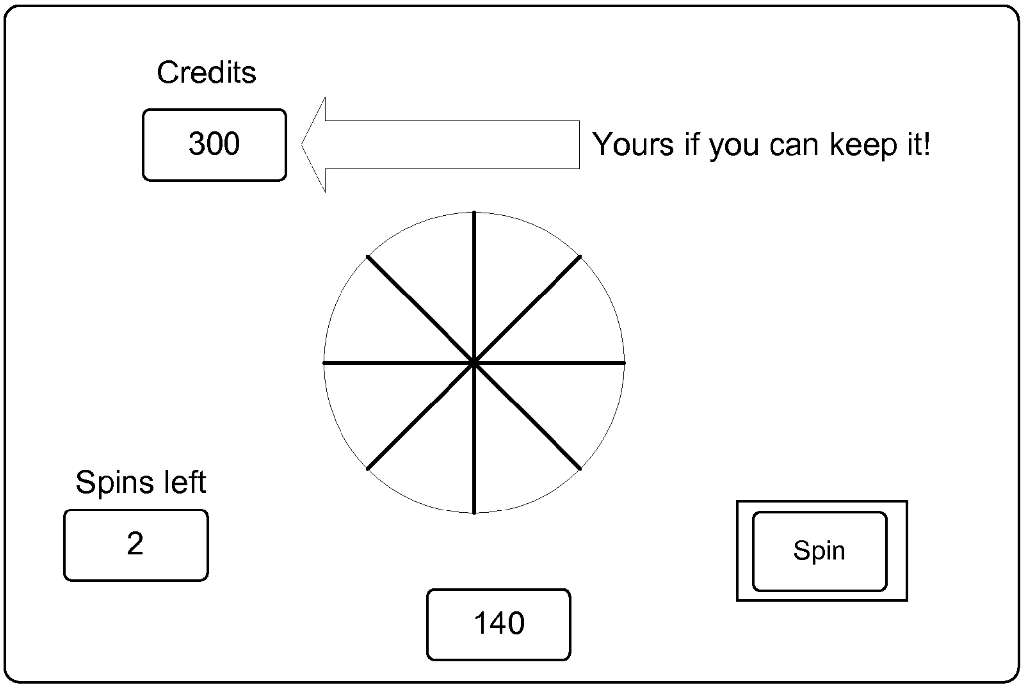
FIGS. 8A, 8B, and 8C are line drawings of example bonus screens according to embodiments of the invention that may be displayed on the gaming device of FIG. 7.

With reference to FIG. 8A, messaging on a screen 430 indicates to the player that the player presently is awarded 300 credits, depicted in a credit window 440. A message to the player indicates that the credits will be awarded to the player if it he or she can keep the credits through the end of the bonus game. A wheel 450 includes indications of a number of credits that are subtracted from the player's current holdings illustrated in the window 440. A spin window 460 indicates how many spins the player must complete before the bonus game ends and the credits are delivered to the player.

Figure 8B:
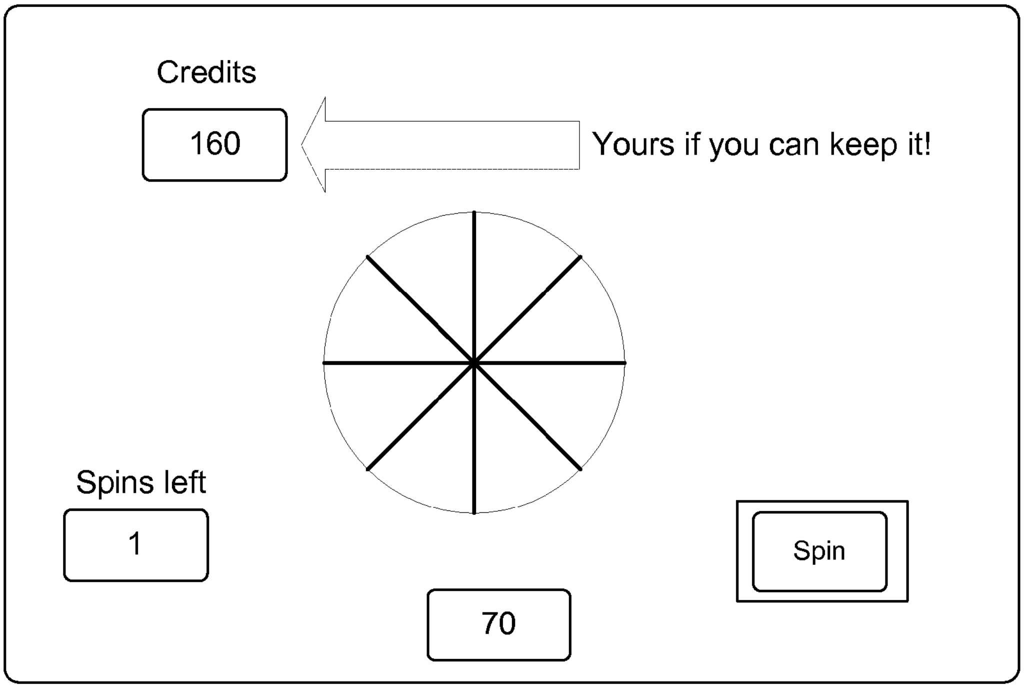
Figure 8C:
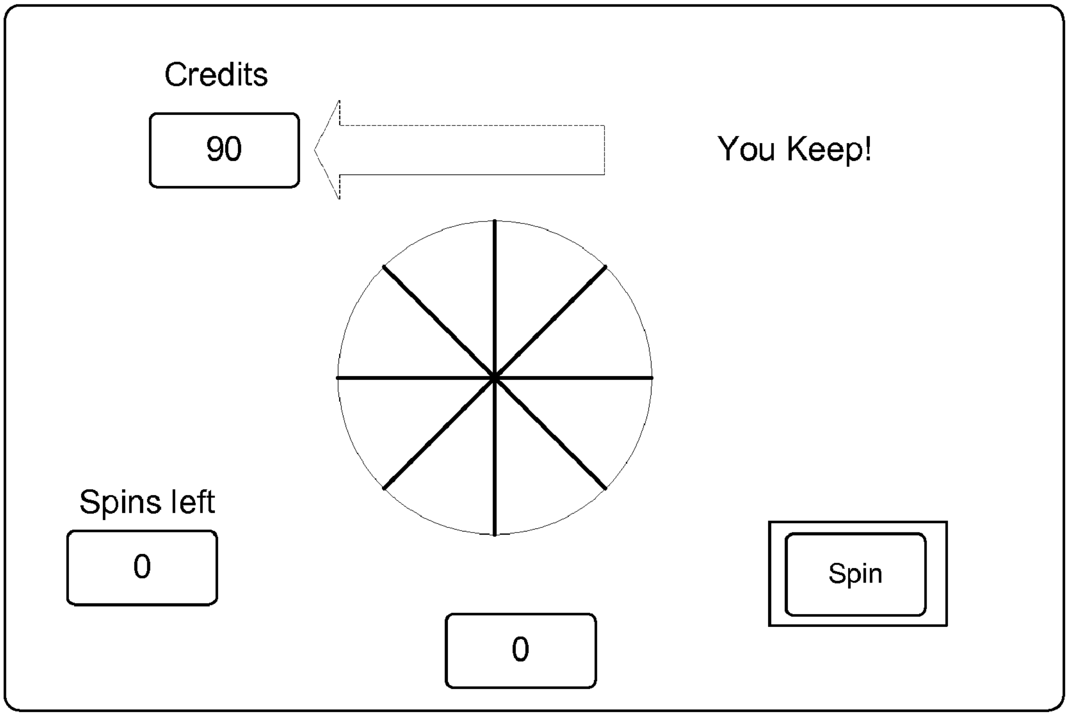

In operation, a player presses a spin button 470 to initiate spinning of the wheel 450. When the wheel 450 stops on a value, the value is indicated in result window 480, which is then subtracted from the current player's subtotal in the credit window 440. In this example, the player started with 300 credits and, after spinning the wheel, 140 credits are subtracted. In FIG. 8B the credit window 440 illustrates that the player currently has 160 credits (300 initially granted less the 140 from the spinning wheel result), but also that the player has one spin left, as indicated in the spin window 460. The player again presses the spin button 470 to initiate spinning of the wheel 450, which lands on 70 credits. As with above, the amount that the wheel landed on, 70 credits, is subtracted from the present subtotal illustrated in the credit window 440. As illustrated in FIG. 8C, the player ends with 90 credits, as illustrated in the credit window 440. And, because there are no spins that the player is required to take, as indicated in the spin window 460, the 90 credits is credited to the player's account.

Including a bonus game having a decrementing value gives the player a sense of "ownership" of the initial amount, even if ultimately the player only actually receives a small part of the original credited amount. In other words, there may be increased entertainment by having the thought of having a large amount of credits, such as 400, if the player can "just hold onto them," even though the player knows that he or she will lose some in the subsequent spins. This is quite a different effect than beginning a bonus with 0 credits then crediting an amount of each spin to a total that the player then keeps, as with bonus games of the prior art.

In other embodiments the player selects a starting amount of credits with the knowledge that every additional credit, or "level" of credits causes the player to be forced to take another spin. For instance, the player may be given the option of being initially credited with 400 credits and needing to take 4 spins, or being initially credited with 600 credits and needing to take 6 spins. Taking a larger amount of initial credits, even with the knowledge that more spins are necessary before the credits being awarded to the player may provide the player additional enjoyment from the game and have a better gaming experience.

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out in the appended claims.

The invention claimed is:

1. A method of awarding a mystery degressive bonus, comprising:

for more than one game in a plurality of games that are participating in a chance to win the degressive mystery bonus, the plurality of games coupled to a gaming network that includes a remote server, compared to a previous game that did not satisfy a trigger of the degressive mystery bonus, increasing, in the remote server, the odds that playing a subsequent game satisfies the trigger of the degressive mystery bonus, while simultaneously decreasing, in the server, an award to be provided should the subsequent game satisfy the trigger.

2. The method of claim 1 in which the award to be provided is not decreased below a non-zero award.

3. The method of claim 1 in which an amount of decrease of the award to be provided between any sequential games of the plurality of games is constant.

4. The method of claim 1 in which an amount of decrease of the award to be provided between any sequential games of the plurality of games is not constant.

5. The method of claim 4 in which the amount of decrease in the mystery degressive bonus diminishes as more games in the plurality of games are played.

6. A display system for a degressive bonus, comprising:

a first portion in which a plurality of odds of satisfying a trigger in a mystery degressive bonus are fixedly displayed;

a second portion in which a plurality of amounts to be awarded should the trigger be satisfied are fixedly displayed; and a movable pointer that simultaneously points to one of the plurality of odds and one of the plurality of amounts to be awarded.

7. The display system of claim 6 in which the pointer is structured to move along a path.

8. The display system of claim 7 in which the pointer is structured to be reset to a first end of the path at the beginning of a mystery degressive bonus period.

9. The display system of claim 8 in which the pointer is structured to move to a second end of the path at the end of the mystery degressive bonus period.

10. The display system of claim 6, further comprising a third portion for displaying a present state of a progressive award.

11. The display system of claim 10 in which the pointer moves at a speed related to a rate at which the progressive award changes.

12. The display system of claim 11 in which a combination of the amount to be awarded should the trigger be satisfied and a present value of the progressive award is constant for at least a portion of the time that the pointer moves along the path.

13. The display system of claim 11 in which a combination of the amount to be awarded should the trigger be satisfied and a present value of the progressive award increases for at least a portion of the time that the pointer moves along the path.

14. The display system of claim 6 in which the moveable pointer is structured to point to a same of one of the plurality of odds despite the pointer having moved along the path.

15. The display system of claim 6 in which the moveable pointer is structured to point to a same of one of the plurality of amounts despite the pointer having moved along the path.

16. A method of awarding a bonus to a player of a gaming device coupled to a gaming network including a server, the method comprising:

Assessing, in the server, a present value of a progressive award that is coupled to a plurality of gaming devices at a time a mystery bonus is triggered;

Assessing, in the server, a present value of a mystery degressive award that is coupled to the plurality of gaming devices, the degressive award separate from the progressive award, and the assessing performed at the time the mystery bonus is triggered; and awarding to a player, from the server, the total of the present value of the progressive award and the present value of the mystery degressive award.

17. The method of claim 16, further controlling a rate of change between any two values of the mystery degressive award to match a rate of change between a corresponding two values of the progressive award.

18. The method of claim 17 in which the two values of the mystery degressive award correspond in time to the two values of the progressive award.

19. The method of claim 16, further comprising displaying to the player the present value of the progressive award and the present value of the mystery degressive award.

* * * * *